June 7, 1938.   S. HEYMAN   2,119,744
ELECTRICAL CONDENSER
Filed March 24, 1932   2 Sheets-Sheet 1
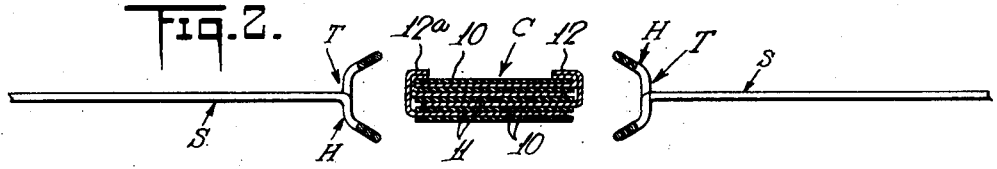
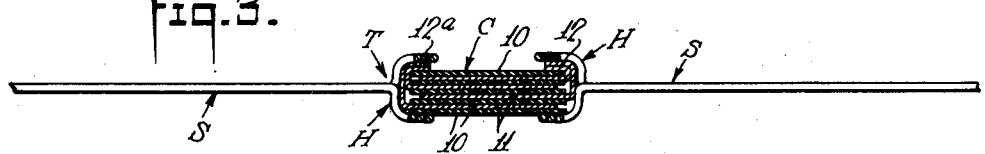
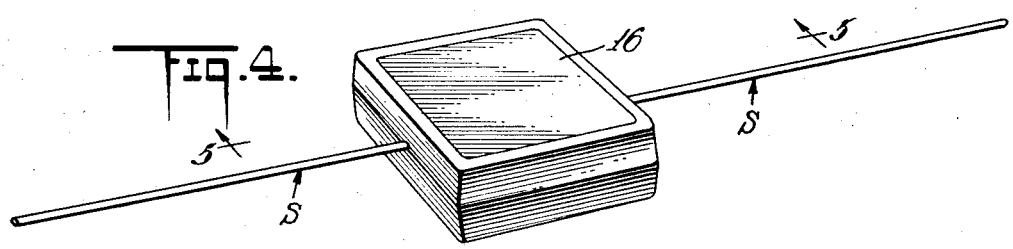
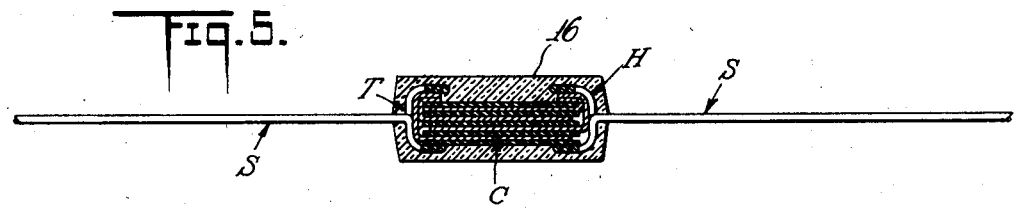
INVENTOR
Sam Heyman
BY
Dean, Fairbank, Hirsch & Foster
ATTORNEYS June 7, 1938.  S. HEYMAN  2,119,744
ELECTRICAL CONDENSER
Filed March 24, 1932  2 Sheets-Sheet 2
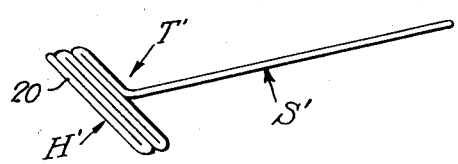
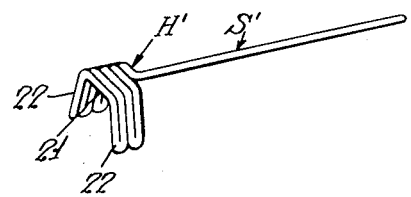
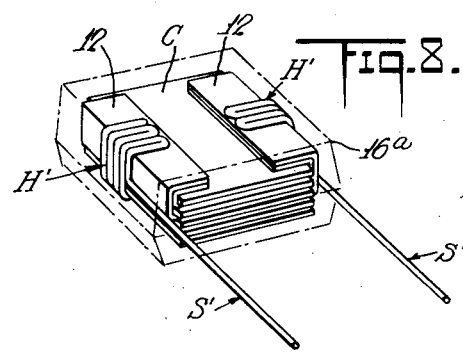
INVENTOR
*Sam Heyman.*
BY
ATTORNEYS Patented June 7, 1938

2,119,744

UNITED STATES PATENT OFFICE 2,119,744

ELECTRICAL CONDENSER

Sam Heyman, Brooklyn, N. Y., assignor to Aerovox Corporation, a corporation of New York Application March 24, 1932, Serial No. 600,876

7 Claims. (Cl. 175—41)

My present invention is particularly concerned with condensers of the character in which a condenser stack together with its terminal structures are completely embedded in a molded body of insulating material with portions of the terminals protruding beyond the insulating material for connection in electrical circuits.

An object of the invention is to provide a condenser of this character in which the size of the molded casing is reduced to a minimum with respect to the size of the condenser stack embedded therein.

Another object is to provide a construction in which proper and effective electrical contact between the armatures of the stack and the terminals of the condenser is assured.

Another object is to provide terminal extensions or lead outs which may be conveniently and expeditiously connected in electrical circuits, even where but little space is available for the introduction of a condenser. Said terminal ends furthermore are preferably sufficiently strong to actually support the weight of the condenser proper, even though the condenser be disposed some distance from the point of juncture of said terminal connection with the bus bars or wires or instruments of the circuit.

Another object is to provide a molded condenser having long strong bendable terminal extensions or shanks projecting beyond the molded, stack-encasing body and integral with the terminal head which engages the armatures of the condenser stack whereby to completely obviate the need for secondary or intermediate electrical and mechanical connections between the projecting terminal shanks and the stack engaging terminal heads.

Another object is to provide a terminal including a portion capable of firmly embracing a condenser stack while making contact with the armatures thereof at a plurality of points, all parts of the terminal however, being integral whereby firm electrical contact at any point assures establishing a good electrical contact between the condenser stack and the terminal clamp.

Preferably the stack proper which may be either thin and limber or thick enough to be substantially inflexible is formed in the usual manner by building up a laminated pile of a plurality of sheets of foil interleaved with one or more flexible mica sheets and the alternate ends of alternate foil (armature) sheets folded over the opposite ends of the stack.

In accordance with the present invention each terminal consists of a length of wire bent to provide a head portion formed of a plurality of contiguous wire folds or convolutions and a shank portion which is afforded by a relatively long continuation of the wire extending substantially at right angles from the head. The head in accordance with one embodiment of the invention is bent into proper form to straddle one end of the stack and is then pressed home to complete the bending and cause several of the convolutions or folds of the head to enter into firm mechanical and electrical contact with the stack and particularly with the exposed armature ends thereof.

The two terminal members and the stack having been assembled the shanks of the terminals may be conveniently used as handles for placing the stack in any suitable mold where both the stack and the terminal heads are molded into a flat slab-like body of hard insulating material with the major portions of the terminal shanks projecting from opposite the body.

A feature of the invention is the fact that the bending stresses on the heads occur where they are most effective, that is, at the ends of the condensers where the terminal heads are actually in contact with the foil. The use of a plurality of convolutions or laterally adjacent rims of wire in the head assures good electrical contact since the contact of any portion of the head with the closely pressed armature foils is as effective as if the entire wire were in contact therewith. Furthermore the individual sections, convolutions or semi-convolutions of wire act independently to grip the stack and assure mechanical gripping thereof at a number of points so that a relatively tight mechanical connection is effected and there is no danger of the stack with its terminals becoming disassembled prior to the molding operation.

The wire used to form the terminal head and the terminal shank is readily bendable but of only slight resilience and tends to stay substantially set in any position into which it is bent. Thus there is no springiness of the wire bending to withdraw it from its clamping engagement with the stack and furthermore the relatively long shanks or lead out extensions which project out from the body of the molded condenser may be conveniently bent into any desired shape and will stay in any shape into which they may be bent for convenience in attaching the condenser in a circuit for mounting it upon a support.

The invention may be more fully understood from the following description in connection with the accompanying drawings wherein:—

Fig. 1 is a perspective view showing one of the improved terminal members prior to bending the head thereof, Fig. 2 is a transverse sectional view through the stack and showing two of the terminal members after being preliminarily bent into such shape that they may be moved into straddling relationship with the ends of the stack, Fig. 3 shows the bent terminal heads moved over the stack and their bending completed so that the stack is gripped and held assembled by its two terminals, Fig. 4 is a perspective view of a completed condenser, Fig. 5 is a transverse sectional view therethrough on the line 5—5 of Fig. 4, Fig. 6 is a view similar to Fig. 1 but illustrating a slightly modified type of terminal, Fig. 7 is a perspective view showing the terminal of Fig. 6 after the preliminary bending of the head, and Fig. 8 is a perspective view showing two terminals of the type shown in Fig. 6 applied to a condenser stack and indicating the molded casing in dotted lines.

In the drawings I have illustrated a condenser stack C built up of alternating mica sheets 10 and narrower sheets of foil 11. The top and bottom sheets of the stack are mica and alternate foil sheets are bent around the ends of the stack and folded over the top thereof as indicated at 12 and 12a. The terminal members of Figs. 1 to 5 which I shall first describe are indicated generally at T. For descriptive convenience I shall term that portion of each terminal member which straddles and embraces the stack as the head H and refer to the protruding terminal extensions S as shanks.

Fig. 1 illustrates a typical terminal in which a straight length of wire comprising the shank S terminates at one end in a portion 14 bent at right angles to the shank. The head S comprises a plurality of wire convolutions 15 lying in the plane of the portion 14 and at right angles to shank S and constituting an integral convolute extension of the shank S.

The head of each terminal member T is bent transversely until it assumes the generally angular but flaring cross-section U shape of Fig. 2 in which condition it is adapted to straddle one end of the preassembled condenser stack C, the flat intermediate portion of the U lying against the edge of the stack and being of a length approximately equal to the thickness of the stack. Bending of the terminals is then completed as in Fig. 3 so that the convolute terminal sections firmly grip and clamp opposite ends of the stack and one or more of the wire convolutions of the head thereof are pressed tightly into engagement with the exposed foil ends 12 and 12a.

It will be seen that the maximum clamping effect is applied at the point desired, that is, directly on the foil and it will also be observed, that inasmuch as there is nothing to prevent the various convolutions of the head from acting separately, each convolution will take its own separate grip on the stack and the stack will be firmly held in the terminals for unitary handling thereof prior to molding the stack and terminal heads in the block of insulating material illustrated at 16, Fig. 4.

This molding operation may be effected in any desired manner preferably by interposing the stack and its attached terminal heads between tablets of bakelite or equivalent material and applying heat and pressure substantially as described in the copending application of Samuel I. Cole, Serial No. 424,219, filed January 29, 1930 and since issued under Patent No. 1,873,548 on August 23, 1932.

Just enough insulating material is used completely to embed and seal the stack and the terminal heads and the shanks of the terminals which are relatively long, project from the opposite sides of the flat body or slab, so that maximum adaptability of the condenser for connection in any electrical circuit is assured.

These protruding shanks are sufficiently flexible and pliant (the wire being preferably made of dead soft tinned copper wire) so that they are not readily broken in transportation or storage and they may be twisted or bent in various ways in order to facilitate the attachment of the condenser at otherwise inaccessible portions of a radio receiving set or other apparatus with which the condenser is to be used.

It may be mentioned here that the thickness of the laminations or sheets as well as the other parts of the condenser are shown on an exaggerated scale, for the sake of clarity although the invention is adaptable to larger condensers of higher capacitance.

In order to utilize a slab of minimum thickness, the embedded end of the shank may lie, as in Fig. 3, between the two planes defined by the top and bottom of the stack instead of lying in the plane above or below the stack or above or below the planes into which stack-engaging portions of the head are bent. Thus for purposes of economy in insulating material and for purpose of reducing the total thickness of the slab it may prove desirable to have the wire head of the terminal so bent that the shank communicates therewith at a point within the periphery of the head. This is true whether the head is circular as illustrated or of any other shape.

Figs. 6 to 8 inclusive, illustrate an alternative form of terminal construction and terminal mounting. Here the shank S' of the terminal T' terminates in a head H' which lies in the plane of the shank S' and is formed by folding the wire back and forth in what might be termed accordion fashion so that the various runs 20 of wire lying side by side produce a substantially solid flat head built of a plurality of integrally connected wire sections disposed in laterally abutting relationship.

Fig. 7 shows the condition of this terminal head after a preliminary bending operation has been performed, the head having been transversely bent into approximate flaring U-shape with a flat intermediate portion 21 of a width approximately corresponding to the thickness of the condenser stack to be embraced and with two flaring arms 22. Shank S' is centered with respect to this bent head, that is, its axis is parallel with the lines along which the head has been bent and the shank joins the intermediate portion 21 of the bent head at the central portion of one edge thereof.

In Fig. 8 I have shown two of these terminals applied to a condenser stack C. Here again the wire terminal heads embrace the ends of the stack and are pressed firmly into clamping engagement with the exposed folded-over ends 12 and 12a of the armature foils. The shanks of the terminals, however, instead of projecting from opposite sides of the molded casing (shown in dotted lines at 16a) lie along the opposite ends of the stack and both project from the same side of the casing, being disposed in parallelism with each other. It will be obvious, of course, that the direction of projection of one of the shanks might be reversed by simply turning its associated stack gripping head around, in which instance the two shanks would project from opposite sides of the molded body, but still be parallel to each other. The arrangement of Fig. 8 is preferred, however, due to the convenience with which access may be had to both of the protruding terminal ends and the great convenience in quickly soldering or otherwise attaching the shanks to bus bars or other conductors or electrical apparatus with which the condenser is to be associated.

In this case as with the type of the terminal shown in Fig. 1 a plurality of wire folds independently grip the foils of the condenser stack, establishing electrical contact therewith at a number of points and it is only necessary that any one of these contacts be perfected in order to assure a highly effective electrical connection.

The terminal shanks in each instance serve as convenient handles for transporting the stack prior to the final molding operation and in each instance the handles project from the molded body a sufficient distance to permit convenient attachment of the condensers in inaccessible places and, if desired, mechanical support of the condensers by the terminal shanks.

As in Fig. 5 just enough molding material is used to completely embed and seal the stack and terminal heads, leaving the major portion of the shanks exposed. The material which is used to embed the stack and the heads of the terminals is preferably light in weight and the insulated product is in the nature of light, flat slab with relatively long wires projecting therefrom, these wires being strong enough to conveniently mechanically support the slab if desired.

The molded insulating material serves a three fold purpose. This material in the first place stiffens and lends rigidity to the stack particularly where the latter is thin and limber. In the second place the molding operation applies further pressure on the terminal heads causing them to firmly grip the stack. In the third place the molding material seals the terminal heads and the stack against the entry of moisture.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention what I claim as new and desire to secure by Letters Patent is:—

1. A terminal for condensers comprising a single length of wire, one end of which constitutes an elongated handle shank, the other end of the wire being bent into form to define a flat head transversely bent for straddling the edge of a condenser stack, the shank joining the head at a point within the periphery of the latter.

2. A terminal for condensers comprising a single length of wire, one end of which constitutes an elongated handle shank, the other end of the wire being bent into form to define a head, said head being bent into approximate U form to straddle the edge of a condenser stack, the shank joining the head at a point within the periphery of the latter, said head being formed of a plurality of convolutions of wire disposed at an angle to the plane of the shank.

3. A terminal for condensers comprising a single length of wire of little resilience, one end of which constitutes an elongated handle shank, the other end of the wire being bent into form to define a head adapted to be transversely bent into clamping engagement with a condenser stack, said head being formed of a plurality of runs of wire folded back and forth in laterally contiguous relationship.

4. A terminal for condensers comprising a single length of wire, one end of which constitutes an elongated handle shank, the other end of the wire being bent into form to define a head transversely bendable into clamping engagement with a condenser stack, said head being formed of a plurality of laterally adjacent runs of wire formed by folding the wire in pleated fashion.

5. A terminal for condensers comprising a single length of wire, one end of which constitutes an elongated handle shank, the other end of the wire being bent into form to define a head transversely bendable into clamping engagement with a condenser stack, said head being formed of a plurality of laterally adjacent runs of wire formed by folding the wire in pleated fashion, the head prior to bending into clamping engagement with the stack being disposed in the same plane as the shank.

6. A terminal for condensers comprising a single length of wire, one end of which constitutes an elongated handle shank, the other end of the wire being bent into convolute form to define a flat head lying at right angles to the plane of the shank, said convolute head bent along two substantially parallel chords, to straddle a condenser stack.

7. A terminal for condensers comprising a single length of wire, one end of which constitutes an elongated handle shank, the other end of the wire being bent into form to define a flat head lying at right angles to the plane of the shank and said wire head being transversely bent along two substantially parallel chords to straddle a condenser stack.

SAM HEYMAN.